United States Patent [19]

Ballentine et al.

[11] Patent Number: 5,066,456
[45] Date of Patent: Nov. 19, 1991

[54] PHOSPHOROUS COPPER BASED ALLOY WITH TIN AND ANTIMONY

[75] Inventors: Richard E. Ballentine, St. Petersburg, Fla.; Joseph W. Harris, Cincinnati, Ohio

[73] Assignee: J. W. Harris Co., Inc., Cincinnati, Ohio

[21] Appl. No.: 566,604

[22] Filed: Aug. 10, 1990

[51] Int. Cl.⁵ .................................................. C22C 9/02
[52] U.S. Cl. .................................... 420/472; 420/470; 420/497; 420/499
[58] Field of Search ................ 420/472, 499, 470, 497

[56] References Cited

U.S. PATENT DOCUMENTS

| | | | |
|---|---|---|---|
| 1,921,416 | 8/1933 | Leach | 420/472 |
| 2,161,057 | 6/1939 | Kalischer | 420/499 |
| 2,390,775 | 12/1945 | Christ | 420/472 |
| 2,554,233 | 5/1951 | Ballentine et al. | 420/470 |

FOREIGN PATENT DOCUMENTS

11164  1/1980  Japan .................................. 420/497

*Primary Examiner*—Prince E. Willis
*Assistant Examiner*—R. D. Flatter

[57] ABSTRACT

A phosphorous copper based alloy having combined tin and antimony contents up to approximately six percent each for brazing filler metal joining copper and copper alloys producing strong clean joints at lower brazing temperatures. Silver added in amounts of 1-18% offers the ability to lower brazing temperatures further.

3 Claims, 1 Drawing Sheet

PHOSPHOROUS COPPER BASED ALLOY WITH TIN AND ANTIMONY

BACKGROUND

This invention relates to a novel brazing filler metal composition. The present invention is particularly concerned with a brazing material suitable for joining copper and copper alloys.

For years the phosphorous-copper alloys, also known as phos-coppers, have proven to be excellent brazing filler metals for joining copper and copper alloys in a variety of applications. Through the years a number of metallic elements have been added to impart useful, special properties to the basic phos-coppers. Among these elements have been silver, tin, nickel and antimony. Most all have been added with the intent of lowering the melting range or, to allow lower phosphorous contents thereby improving ductility.

In the past researchers have disclosed the addition of many elements to the phos-coppers but none with the novel combination of tin and antimony resulting in a brazing filler metal with the improved properties disclosed herein. The composition of the present invention is not disclosed or suggested by any prior art.

Vaders, in U.S. Pat. No. 2,069,906 discloses the addition of phosphorous and antimony to copper for a welding electrode wherein the phosphorus is present in very small amounts as a deoxidizing agent. This combination melts at a very high temperature and is entirely unsuitable for brazing.

Smith, in his U.S. Pat. No. 2,073,077 suggests that high tin contents when added in combination with phosphorous lower the melting range of the filler metal. He mentions small amounts of antimony only as an impurity. Smith claims a tin content of 13-15% and phosphorous from 3.5-5.5%. The resulting alloys are quite brittle and according to Smith are available in cast or granulated forms only. These alloys are too brittle and are not suitable for most brazing applications.

Kalischer, in his U.S. Pat. No. 2,161,057, covers the addition of antimony only to the phos-coppers and indicates various "flow points" for various combinations of antimony and phosphorus, but does not indicate solidus and liquidus temperatures. The actual melting ranges of these alloys vary widely and do no reflect the advantages attributable to the combination of tin and antimony.

Accordingly, the object of the present invention is to provide a brazing filling metal having the desirable ductility and melting range. Another object of the present invention is to provide a phosphorous copper based alloy which has improved joint appearance. Still a further object of the invention is to produce a phosphorous copper alloy for brazing which reduces braze residue and which is susceptible to easy cleaning. Yet another object of this invention is to provide a low-cost phosphorous copper alloy for brazing which is capable of filling poorly fitting joints.

SUMMARY OF THE INVENTION

The above objects and advantages are achieved according to the invention by providing a brazing filler material comprising by weight one to six percent tin, one to six percent antimony, seven percent phosphorous and the balance copper. This novel composition offers sufficiently broad melting range at lower temperatures yet enables the joining of poorly fitted joints without the addition of silver.

The addition of silver can lower the liquidus. A typical alloy composition of two percent tin, two to four percent antimony, six to seven percent phosphorous, one to eighteen percent silver and the balance copper provides excellent results.

DETAILED DESCRIPTION OF THE INVENTION

Figure 1:
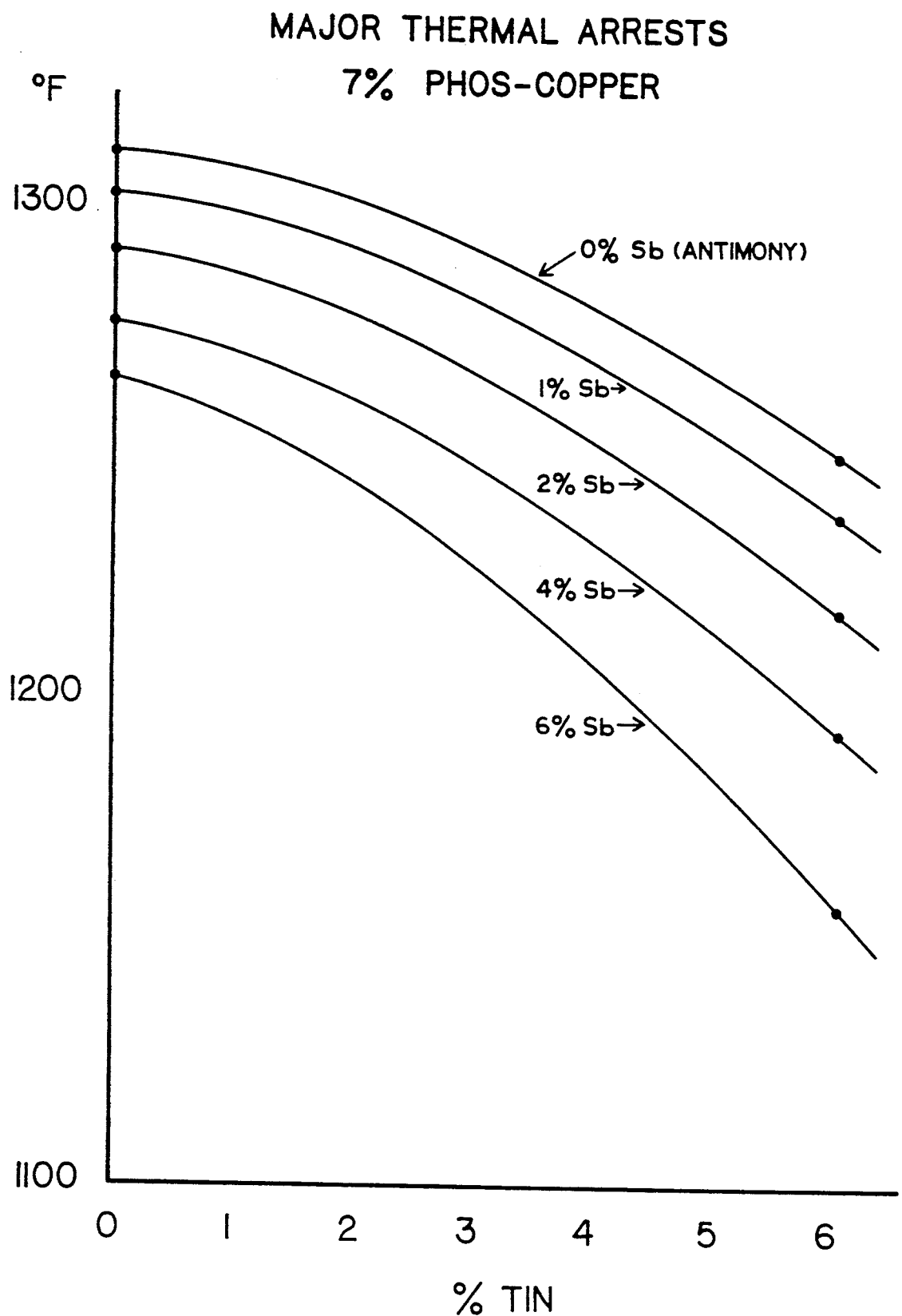

This invention is based on the discovery that the addition of a specific combination of tin and antimony provides important additional benefits to the phos-coppers. The melting range can be lowered and broadened, giving the filler metal ability to fill poorly fitted joints without adding costly silver metal. At the same time when the combination is added to the silver-phos-copper alloys the melting range, and especially the solidus temperature, can be lowered significantly.

Another very important result of the addition of the tin-antimony combination is the improvement in joint appearance of the finished brazement. The phos-coppers when used with or without a flux leave a black residue adjacent to the braze which is difficult to remove and may interfere with subsequent plating in some applications. The addition of a combination of tin and antimony reduces this residue significantly and the parts may be easily cleaned for plating, if necessary.

An analysis of cooling curves run on the phosphorous-copper alloys with the addition of a combination of tin and antimony discloses a number of minor thermal arrests in the curves, and consequently the true liquidus temperature is difficult to determine accurately. Invariably, however, there is a major thermal arrest near, or at, the solidus temperature which indicates the solidification temperature (and conversely the melting temperature) of a major portion of the alloy.

These major thermal arrests are plotted for various tin and antimony contents in FIG. 1. These show a drop of 10°-15° per 1% of antimony depending on the tin content. This is a significant figure for many brazing applications. A further advantage realized by this invention is in improved joint appearance with the combined tin and antimony additions and offers users a unique opportunity to avoid expensive cleaning operations while at the same time lowering brazing temperatures.

Antimony and tin contents up to about 6% each were found to produce strong, clean joints at reasonable brazing temperatures. Specific data on some of these combinations are shown in Table 1. As in the phos-copper alloys the addition of silver from 1-18% offers further benefits in lowering brazing temperatures with tin/antimony additions. Table 2 shows typical reductions in the major thermal arrests with various additions of silver.

TABLE I

| ALLOY | Cu | P | Sn | Sb | Major Thermal Arrest |
|---|---|---|---|---|---|
| 1 | 91 | 7 | 1 | 1 | 1300° F. |
| 2 | 90 | 7 | 1 | 2 | 1290° |
| 3 | 88 | 7 | 1 | 4 | 1270° |
| 4 | 86 | 7 | 1 | 6 | 1235° |
| 5 | 89 | 7 | 2 | 2 | 1275° |
| 6 | 87 | 7 | 2 | 4 | 1250° |
| 7 | 85 | 7 | 2 | 6 | 1215° |
| 8 | 87 | 7 | 4 | 2 | 1255° |
| 9 | 85 | 7 | 4 | 4 | 1230° |
| 10 | 83 | 7 | 4 | 6 | 1190° |

TABLE I-continued

| ALLOY | Cu | P | Sn | Sb | Major Thermal Arrest |
|---|---|---|---|---|---|
| 11 | 85 | 7 | 6 | 2 | 1240° |
| 12 | 83 | 7 | 6 | 4 | 1205° |
| 13 | 81 | 7 | 6 | 6 | 1155° |

TABLE II

| ALLOY | Cu | Ag | Sn | Sb | Major Thermal Arrest |
|---|---|---|---|---|---|
| 1 | 88 | 7 | 1 | 2 | 2 1260° F. |
| 2 | 84 | 6 | 6 | 2 | 2 1212° |
| 3 | 70 | 6 | 18 | 2 | 4 1115° |

Table I and II show major thermal arrests for some specific alloys. It is evident, however, that a number of modifications within, or near, the limits shown below will yield similar results.

We claim:
1. A phosphorous-copper based alloy comprising by weight:
1.0-6% tin
1.0-6% antimony
7% phosphorous
and the balance copper.

2. A phosphorous-copper based alloy comprising by weight:
2% tin
2-4 % antimony
1-18% silver
6-7% phosphorous
and the balance copper.

3. A phosphorous-copper based alloy comprising by weight:
1.0-6% tin
1.0-6% antimony
0-18% silver
5.0-8.3% phosphorous
and the balance copper.

* * * * *